No. 763,145. Patented June 21, 1904.

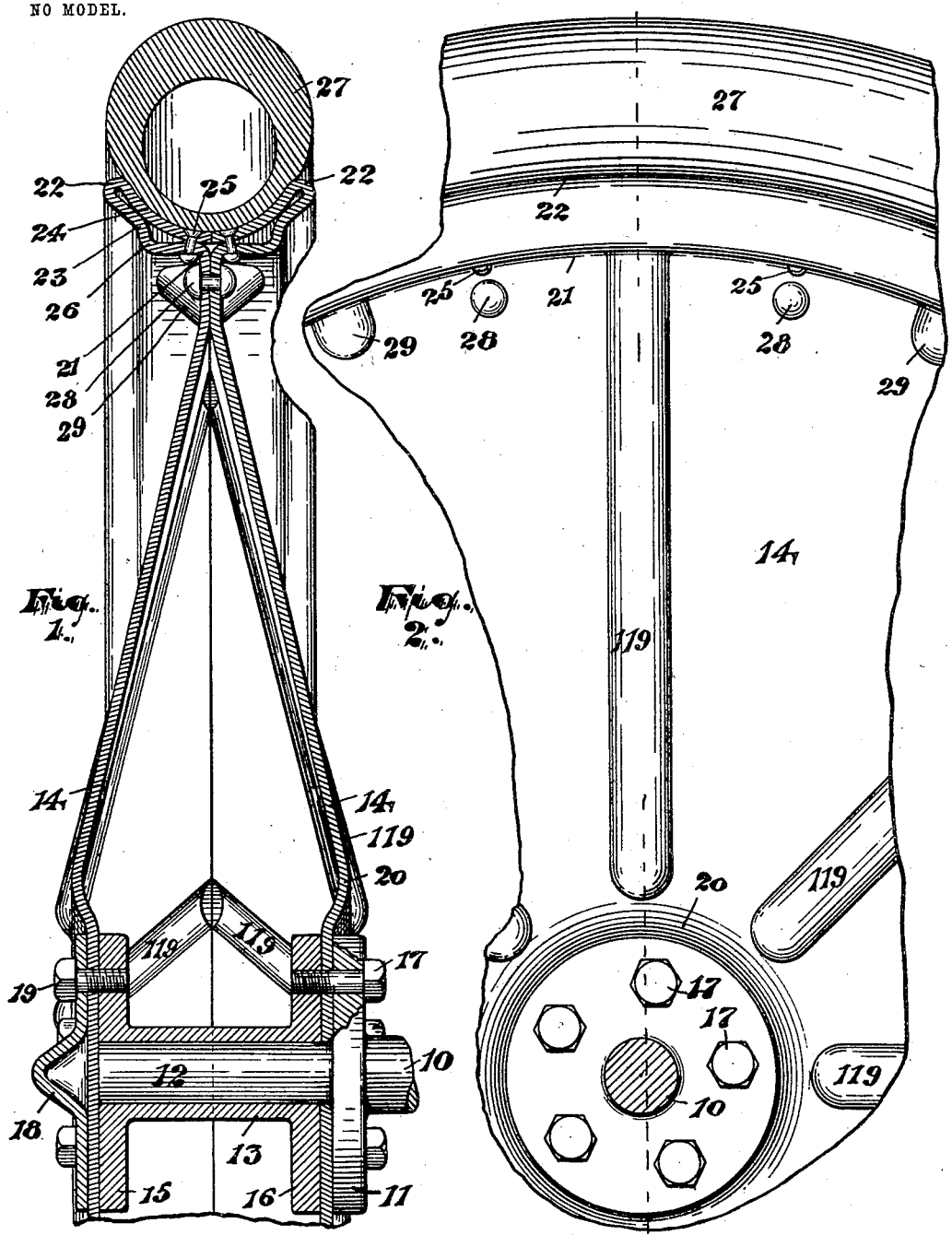

UNITED STATES PATENT OFFICE.

JOHN A. BRENNAN, OF WEST ORANGE, NEW JERSEY.

VEHICLE-WHEEL.

SPECIFICATION forming part of Letters Patent No. 763,145, dated June 21, 1904.

Application filed March 11, 1904. Serial No. 197,681. (No model.)

*To all whom it may concern:*

Be it known that I, JOHN A. BRENNAN, a citizen of the United States, residing at West Orange, in the county of Essex and State of New Jersey, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The objects of this invention are to reduce the cost of construction and facilitate the manufacture of automobile-wheels, to secure a wheel of greater strength and durability of structure, and to secure other advantages and results, some of which may be referred to hereinafter in connection with the description of the working parts.

The invention consists in the improved wheel for automobiles and similar vehicles and in the arrangements and combinations of parts of the same, all substantially as will be hereinafter set forth, and finally embraced in the clauses of the claim.

Referring to the accompanying drawings, in which like figures of reference indicate corresponding parts in each of the figures, Figure 1 is a sectional view of a portion of a wheel of my improved construction, the section being taken at line $x$ of Fig. 2; and Fig. 2 is a side elevation of the same.

In said drawings, 10 indicates the axle of the wheel, which comprises an axial shaft having a flange 11 near its extremities and a reduced end 12, on which a flanged collar 13 may be arranged, as hereinafter described.

14 14 indicate the oppositely-dished disks, the inner one of which is centrally perforated to receive and lie upon the reduced end 12 of the shaft against the flange 11 thereof. The outer disk 14 lies against the outer extremity of the reduced end 12 and against the flange 15 of the collar 13. The said collar 13 is provided with two flanges 15 and 16, one at each of its ends, the inner flange 16 of which lies against the face of the inner disk 14, near the center thereof, clamping said disk against the flange 11, and is perforated in correspondence with perforations in the disk and flange 11 to receive screws or bolts 17. The outer flange 15 of the collar 13 is likewise perforated in correspondence with perforations formed in the outer disk and a stay-plate 18 to receive screws or bolts 19. The dished disks 14 are flat where they engage the flanges 15 and 16 and radially outside of said flanges are bent outwardly, as at 20, to give increased stiffness to the disks, and said disks are also provided with radial strengthening-ribs 119, pressed into said metal also to stiffen the same. Near their peripheries the said disks are laterally annularly bent, as as 21, and then inwardly bent, as at 22, the outer and inner extensions 23 24, resulting from bending, being riveted together, as at 25. The outer bend or extension 23 is not preferably a direct outward bend, but is made wavy, as shown at 26, thereby increasing the strength of said outer extension. The inner extension, formed by doubling the metal, is concaved to receive the cushioned or pneumatic tire 27, which latter may be of any ordinary construction or material. The disks 14 14 are riveted together near their peripheries, as at 28, the rivets being distributed at regular intervals in any suitable manner. The metal in the angle formed by the body of the disk and the lateral bend or extension 23 thereof is pressed out at intervals (indicated at 29) to brace the said outer extension and give greater firmness and strength to the seat for the tire, the radial ribs 119 alternating with the braces 29, extending to said lateral extension, to coöperate in effecting the increased strength referred to. Thus constructed the wheel operates in connection with the vehicle in any usual manner with great strength and durability.

Having thus described the invention, what I claim as new is—

1. The improved wheel herein described, comprising the dished disks, bent laterally outward and then inward at their peripheries, the edge of the inward extensions being riveted to the outward extensions and forming a seat, and a tire arranged on said seat, substantially as set forth.

2. The improved wheel comprising the oppositely-dished disks riveted together at their peripheries, said disks being laterally turned outward to form extensions 23, and then inward, annularly, as at 24, the inner edges of the part 24, being fastened to the part 23, said parts or extensions being concaved at their outer sides to receive the tire, substantially as set forth.

3. The improved wheel herein described comprising dished disks having outer bends, at their peripheries, the said outer bends being supplemented by inner bends, the outer and inner bends being riveted together to provide a seat for the tire, substantially as set forth.

4. The improved wheel herein described comprising the dished disks, riveted together at their peripheries and having wavy laterally-outward extensions and a return inward bend or extension at said periphery, the outward and inward bends or extensions being riveted together and having braces formed with the dished-shape disks and outward extensions to brace the said extensions, substantially as set forth.

In testimony that I claim the foregoing I have hereunto set my hand this 7th day of March, 1904.

JOHN A. BRENNAN.

Witnesses:
CHARLES H. PELL,
RUSSELL M. EVERETT.